United States Patent Office 2,924,548
Patented Feb. 9, 1960

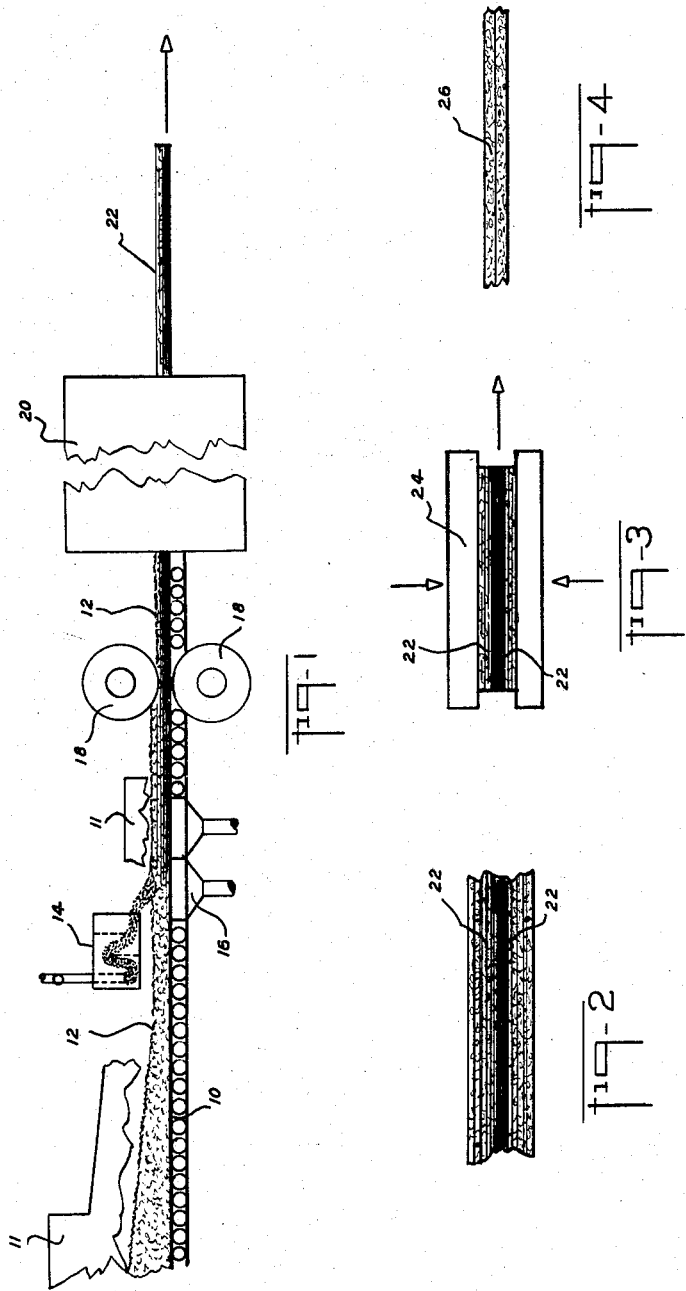
INVENTOR
WILLIAM A. COTTON

2,924,548

PROCESS FOR MAKING LAMINATED HARDBOARD PRODUCT

William A. Cotton, Wilmette, Ill., assignor to Masonite Corporation, Laurel, Miss., a corporation of Delaware Application July 16, 1956, Serial No. 597,872

4 Claims. (Cl. 162—132)

The present invention relates to the production of lignocellulose hardboard. More particularly, the invention relates to the production of two-ply laminated hardboard articles. Even more particularly the invention relates to a method of preparing laminated hardboard sheet products containing a major proportion of hydrolyzed redwood fiber. The invention includes both the laminated products and the method of their manufacture.

It has been known to the art for many years that there may be produced a desirable lignocellulose hardboard sheet product characterized by its having two smooth surfaces as well as by its outstanding physical properties. The method for the preparation of such a product is described and claimed in U.S. Patent No. 2,120,137 to Mason, issued June 7, 1938. The patent discloses the felting of a sheet of hydrolyzed lignocellulose followed by drying the sheet and thereafter subjecting it to consolidating temperature and pressure between two smooth press platens. The product, having two smooth surfaces, has had wide commercial acceptance for several years.

The manufacture of these prior art products, however, has been restricted to hardboard sheets about one-eighth inch thick or less. This practice has been due, largely, to manufacturing conditions which have made it more practicable to produce relatively thin sheets rather than hardboard about one-quarter inch thick. The conditions responsible are connected with the speed of formation of the lap, the uniformity of lap formation, and the pressing times involved in the manufacture of the products. It has therefore been commercially unfeasible to produce thicker sheet products in a single manufacturing operation.

It is a principal object of the present invention to provide a method for the preparation of two-ply laminated lignocellulose hardboard sheet articles in one manufacturing operation.

It is another object of the invention to provide a method for laminating dry felted laps of hydrolyzed lignocellulose fiber without the use of additional bonding agents.

A further object of the invention resides in the provision of novel two-ply laminated hardboard sheet articles containing a major proportion of redwood fiber. Other objects of the invention will become apparent from the following detailed description of the invention.

Hydrolyzed redwood fiber, either alone or in admixture with other similarly hydrolyzed wood fiber such as fir, gum, pine, or the like, is first suitably refined in water slurry. Thereafter, the fiber is formed into a wet lap on a conventional modified Fourdrinier machine. As the lap travels along the forming wire screen it is subjected to suction following a travel period of free water drainage. The application of suction not only removes much of the water, but also serves to concentrate in the lower portion of the lap the fines material which is always present in hydrolyzed wood fiber. In the case of redwood, the fines material is recognized as possessing outstanding adhesive qualities and the concentration of this material in the lower portion of the wet lap has been found to be of great importance in the succeeding steps of the present novel method.

At this point of formation of the wet lap it has been found desirable, in some instances, to add additional water to the top surface of the lap. The added water insures that substantially all of the soluble material present is flushed from the upper portion of the wet lap and concentrated in the lower portion thereof. Then the lap is squeezed between pressure rolls and dried in a conventional drying apparatus.

In following the novel method of the invention it is important that the substantially dried lap have a moisture content of from about 0.2% to about 2.0% prior to consolidation. Moisture contents below about 0.2% result in insufficient consolidation of the fiber together with lowered and unacceptable bond strengths in the finished laminated articles. Moisture contents in excess of about 2.0% result in the formation of blisters in the laminated products as well as undesirably high densities.

Thereafter, the substantially dry laps are arranged in two-ply condition with the bottom lap surfaces in contact with each other. The two-ply stacks are then charged to the openings of a multiplaten press. The laps are consolidated at pressures of from about 1000 to about 1600 p.s.i. and at temperatures of about 390°–410° F. In pressing it is desirable, for example, to subject the laps to an initial pressure of about 200–400 p.s.i. with frequent release of the pressure to allow escape of moisture and other volatile materials. This treatment, i.e. the intermittent release of pressure, is termed "breathing" and is effected at about 30 second intervals during the low pressure treatment. The higher pressure of about 1000–1600 p.s.i. is then applied to effect consolidation and lamination of the laps. Ordinarily, the low pressure treatment will extend over 2 or 3 minutes and the higher pressure is applied for about 30 to about 120 seconds. Subsequent to the pressing cycle the press is opened and the laminated articles removed therefrom without cooling.

The laminated products, having two smooth surfaces, have an average specifica gravity within the range of about 1.1–1.30, average bond strength of about 250–400 p.s.i. and outstanding qualities as regards modulus of rupture and transverse strength properties. It is, of course, of outstanding importance that these properties are obtained without the employment of any added binding material in or between the plies in contrast to previous practice in preparing similar relatively low density laminates.

In carrying out the novel method of the invention a principal critical feature resides in the step of arranging the two laps for consolidation with their bottom surfaces contacting each other. Where the laps are not so positioned there is not sufficient adhesion between the laps to insure obtaining a dependable bond therebetween. Another critical feature resides in the use of from about 100% to about 75% by weight of hydrolyzed redwood fiber in forming the laps. The fines material of woods other than redwood apparently does not possess similar outstanding adhesive properties and diminution of the redwood fines by exceeding the above stated limits results in undesirable laminates.

The novel steps of the invention which must, therefore, be followed may be outlined as follows, the outline being directed particularly to the drawing in which:

Fig. 1 is a schematic diagram illustrating the formation of a wet lap, and the dewatering and drying thereof, Fig. 2 is a sectional side elevation of two dried laps in position for pressing, Fig. 3 is a schematic side elevation of a press in the process of consolidating two laps, and Fig. 4 is a sectional side elevation of the consolidated laminated article.

In the process therefore:

(1) A fibrous slurry is flowed onto a traveling screen forming a felted lap containing 75%–100% of hydrolyzed redwood fiber, (2) The fines and water solubles are concentrated in the lower portion of the lap by flowing additional water onto the wet lap surface, (3) The wet lap is partially dewatered by suction means and by pressure rolls, (4) The lap is dried to a moisture content of 0.2%–1.5%, (5) Two such dried laps are then arranged with the bottom surfaces thereof contacting each other, and (6) The two laps are consolidated and laminated by pressing at about 1000–1500 p.s.i. pressure at about 390°–410° F.

With more particular reference to the drawing, in Fig. 1 the numeral 10 is a traveling wire screen of a Fourdrinier machine 11 upon which an aqueous fiber slurry is flowed to form the wet lap 12. Additional water is flowed onto the upper surface of the wet lap 12 from the weir 14. Thereafter, the wet lap passes over the suction boxes 16 and between the pressure rolls 18. The partially dewatered lap is then traveled through a conventional drier 20 and emerges therefrom as the dried lap 22. Two of these dried laps 22 are arranged, as shown in Fig. 2, with their bottom surfaces in contact with each other. The laps 22 are then placed in the press 24, shown in Fig. 3, and consolidated to produce the laminated hardboard product 26 illustrated in Fig. 4.

The invention will be illustrated with more particularity by the data of the following tables. Table I presents the conditions under which the two-ply hardboards were made, while Table II presents the physical properties of the products. It is to be understood, however, that the examples are given for illustrative purposes alone and the invention is to be limited only by the scope of the appended claims.

*Table I*

| Sample No. | Thickness of Product, inches | Consolidation Temp. (° F.) | Low Pressure (p.s.i.) | Time under Low Pressure (Minutes) | Breathes @ 30 sec. Intervals | High Pressure (p.s.i.) | Time under High Pressure (Seconds) | Moisture in Sample (Percent) | Percent Redwood |
|---|---|---|---|---|---|---|---|---|---|
| 1 | 3/16 | 390 | 200–350 | 2.5 | 4 | 1,000 | 30 | 1.0 | 100 |
| 2 | 1/4 | 405 | 200–350 | 3.0 | 5 | 1,250 | 60 | 0.5 | 100 |
| 3 | 3/16 | 395 | 200–350 | 4.0 | 6 | 1,000 | 45 | 0.2 | 100 |
| 4 | 1/4 | 400 | 200–350 | 3.0 | 5 | 1,600 | 45 | 2.0 | 80 |
| 5 | 1/4 | 410 | 200–350 | 3.0 | 5 | 1,500 | 90 | 1.5 | 80 |

*Table II*

| Sample No. | Specific Gravity | M.O.R. | Bond Strength |
|---|---|---|---|
| 1 | 1.1 | 6,500 | 250 |
| 2 | 1.17 | 8,100 | 375 |
| 3 | 1.14 | 7,000 | 310 |
| 4 | 1.26 | 7,400 | 325 |
| 5 | 1.24 | 8,000 | 280 |

All of the samples represented in the tables were substantially free from surface irregularities and were of substantially uniform density throughout. Apparently, during consolidation of the laps, the areas of higher density in one lap are pressed into and are absorbed by the other lap to produce a hardboard product of desirably uniform density.

It will be appreciated, from the above data, that the consolidation conditions can be varied within the stated limits. A longer breathing period may be followed, where desired, by a shorter period at high pressure. Similarly, products having specific gravities over the entire range of about 1.1 to about 1.3 may be obtained by adjusting the consolidation cycle. While the preferred specific gravity range lies within about 1.12 to 1.18, hardboard products having lower or higher densities are often of great value in particular usages. The consolidation conditions hereinbefore given, however, are extremely critical. Lower temperatures and pressures are productive of products having little or no bond strength. Higher temperatures cause sticking of the products to the press platens. Within the stated limits, however, and employing a major proportion of hydrolyzed redwood fiber, the art is presented with a novel and highly desirable method of preparing improved laminated hardboard products.

I claim:

1. A method of preparing a laminated sheet product of fibrous hydrolyzed redwood lignocellulose which comprises felting a lap of said lignocellulose from an aqueous slurry thereof, partially dewatering said lap, flowing onto the upper surface of said lap a quantity of water sufficient to substantially remove from the upper portion of the lap the fines and water soluble material therein and to concentrate said material in the bottom portion of the lap, drying the lap to a moisture content of about 0.2–2.0%, arranging two of said dried laps in face to face relationship, the faces in contact with each other being the ones containing said concentrated material, and thereafter consolidating said laps into a laminated sheet product by the application thereto of heat and pressure.

2. A method of preparing a laminated sheet product of fibrous hydrolyzed redwood lignocellulose which comprises arranging in surface to surface relationship two fibrous substantially dry laps of said lignocellulose, said laps having been prepared in such manner as to concentrate in one surface thereof the fines material present therein, the surfaces in contact with each other in said arrangement being the ones containing the concentrated fines material, and subjecting said laps containing not more than about 2.0% moisture to pressure of about 1000–1600 p.s.i. and a temperature of about 390°–410° F. for a period of time sufficient to laminate said fibrous hydrolyzed lignocellulose which comprises laps into a consolidated sheet product.

3. A method of preparing a laminated sheet product felting a lap of said lignocellulose containing a major proportion of redwood fiber from an aqueous slurry thereof, applying suction to the bottom of said lap, drying the lap to a moisture content of about 0.2% to about 2.0%, arranging two of said dried laps with their bottom surfaces contacting each other, and thereafter consolidating said laps into a laminated sheet product by the application thereto of heat and pressure.

4. A method of preparing a laminated sheet product of fibrous hydrolyzed lignocellulose together with the fines and water soluble material formed during hydrolysis which comprises felting a lap of said lignocellulose containing a major proportion of redwood fiber from an aqueous slurry thereof, concentrating the said material in the bottom portion of the wet lap by the application of suction thereto followed by the application of pressure, drying the wet lap to a moisture content of about 0.2% to about 2.0%, arranging two of said dried laps with their bottom surfaces contacting each other, charging the two laps to a heated press opening, subjecting the laps to pressure of about 1000–1600 p.s.i. and a temperature of about 390°–410° F. until said laps have become consolidated and laminated, and thereafter removing the laminated product from the press opening while still hot.

References Cited in the file of this patent

UNITED STATES PATENTS

| | | |
|---|---|---|
| 1,707,333 | Traquair | Apr. 2, 1929 |
| 1,730,849 | Hinde | Oct. 8, 1929 |
| 1,884,563 | Carson | Oct. 25, 1932 |
| 1,951,017 | Hatch | Mar. 13, 1934 |
| 1,995,145 | Frost | Mar. 19, 1935 |
| 2,098,733 | Sale | Nov. 9, 1937 |
| 2,120,137 | Mason | June 7, 1938 |
| 2,380,214 | Burrell | July 10, 1945 |